United States Patent
Egashira et al.

(10) Patent No.: US 11,489,213 B2
(45) Date of Patent: Nov. 1, 2022

(54) POWER SUPPLY DEVICE AND VEHICLE EQUIPPED WITH SAME

(71) Applicant: SANYO Electric Co., Ltd., Osaka (JP)

(72) Inventors: Takuya Egashira, Hyogo (JP); Noriharu Kobayashi, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 33 days.

(21) Appl. No.: 17/256,137

(22) PCT Filed: May 17, 2019

(86) PCT No.: PCT/JP2019/019681
§ 371 (c)(1),
(2) Date: Dec. 24, 2020

(87) PCT Pub. No.: WO2020/003802
PCT Pub. Date: Jan. 2, 2020

(65) Prior Publication Data
US 2021/0226268 A1    Jul. 22, 2021

(30) Foreign Application Priority Data
Jun. 26, 2018 (JP) .............................. JP2018-120850

(51) Int. Cl.
*H01M 10/34* (2006.01)
*H01M 10/44* (2006.01)
(Continued)

(52) U.S. Cl.
CPC ....... *H01M 10/443* (2013.01); *H01M 10/425* (2013.01); *H01M 10/482* (2013.01);
(Continued)

(58) Field of Classification Search
CPC ............. H01M 10/443; H01M 10/446; H01M 10/448; H01M 10/625; H01M 10/425;
(Continued)

(56) References Cited

U.S. PATENT DOCUMENTS

2012/0276423 A1* 11/2012 Asakura .............. H01M 10/443
429/56
2014/0308550 A1   10/2014 Shimizu et al.
(Continued)

FOREIGN PATENT DOCUMENTS

WO        2013/069308        5/2013

OTHER PUBLICATIONS

International Search Report of PCT application No. PCT/JP2019/019681 dated Jul. 30, 2019.

*Primary Examiner* — Raymond Alejandro
(74) *Attorney, Agent, or Firm* — WHDA, LLP

(57) ABSTRACT

The power supply device including: a plurality of secondary battery cells each including a gas discharge valve for discharging internal gas; a plurality of voltage detection lines for detecting voltage of the corresponding plurality of secondary battery cells; a plurality of current fuses provided in the respective plurality of voltage detection lines to shut off current flow when currents flowing through the respective voltage detection lines exceed a predetermined value; and gas guide path communicating with the gas discharge valve to discharge gas discharged from the gas discharge valve to the outside. At least one of the plurality of current fuses is disposed in gas guide path, and is composed of thermal fuse that shuts off current flow depending on temperature of the gas discharged from the gas discharge valve.

7 Claims, 15 Drawing Sheets

(51) Int. Cl.
    *H01M 10/625*    (2014.01)
    *H01M 50/317*    (2021.01)
    *H01M 10/42*     (2006.01)
    *H01M 10/48*     (2006.01)
    *H01M 10/52*     (2006.01)

(52) U.S. Cl.
    CPC ......... *H01M 10/52* (2013.01); *H01M 10/625* (2015.04); *H01M 50/317* (2021.01); *H01M 2010/4271* (2013.01)

(58) Field of Classification Search
    CPC ........... H01M 10/4271; H01M 10/482; H01M 10/52; H01M 50/317; H01M 50/325; H01M 2010/4271
    See application file for complete search history.

(56) References Cited

U.S. PATENT DOCUMENTS

| | | | | |
|---|---|---|---|---|
| 2017/0025871 A1* | 1/2017 | Choi | ...................... | H02J 7/0029 |
| 2018/0183020 A1* | 6/2018 | Ju | ....................... | H01M 50/516 |
| 2018/0337376 A1* | 11/2018 | Jin | ...................... | H01M 10/613 |

* cited by examiner

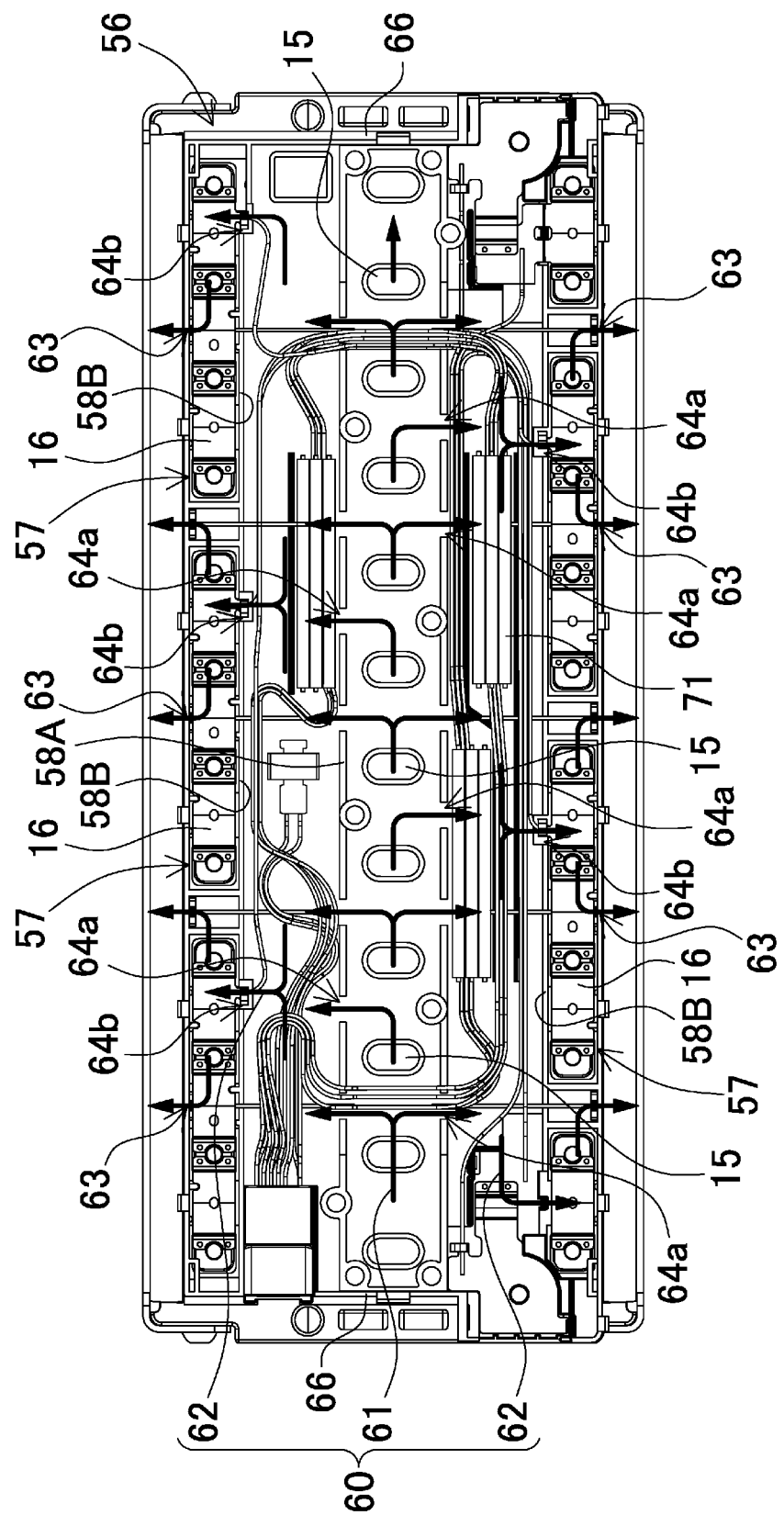

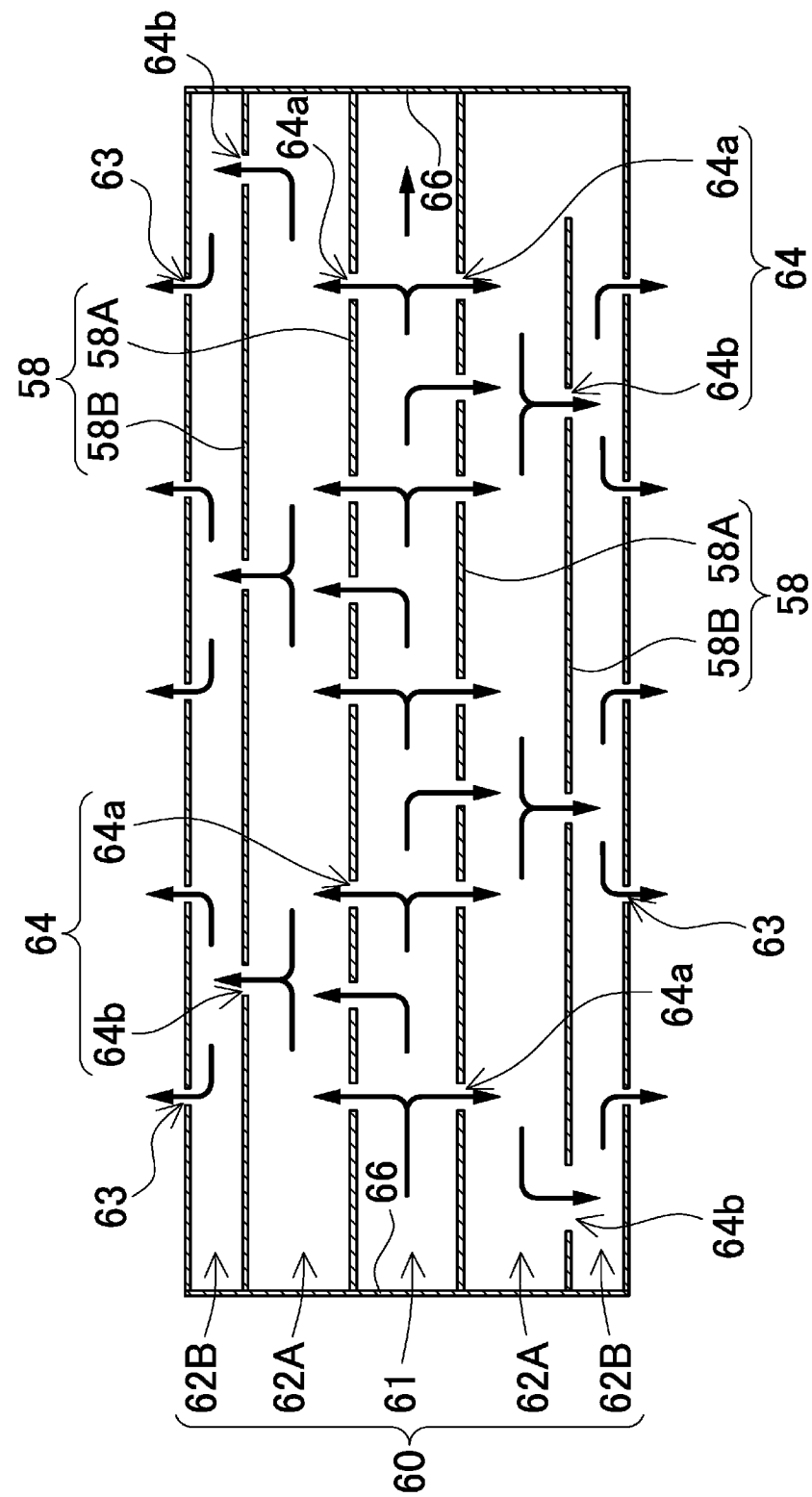

POWER SUPPLY DEVICE AND VEHICLE EQUIPPED WITH SAME

CROSS-REFERENCE TO RELATED APPLICATIONS

This application is a U.S. national stage application of the PCT International Application No. PCT/JP2019/019681 filed on May 17, 2019, which claims the benefit of foreign priority of Japanese patent application No. 2018-120850, filed on Jun. 26, 2018, the contents all of which are incorporated herein by reference.

TECHNICAL FIELD

The present invention relates to a power supply device and a vehicle equipped with the power supply device.

BACKGROUND ART

A power supply device is used for driving a vehicle or the like. Such a power supply device is capable of outputting a large current by connecting many secondary battery cells in series or in parallel. In recent years, secondary battery cells have been increased in capacity, and how to implement measures against heating and burning of secondary battery cells has become an issue. In particular, secondary battery cells with high capacity have high battery energy, so that ensuring safety is important.

Gas discharge is an abnormality of the secondary battery cell, so that measures such as stopping electrical discharge of the power supply device needs to be promptly performed and a mechanism for quickly and surely detecting the gas discharge is required. As a structure including such a mechanism, the following power supply device of PTL 1 is known.

The power supply device of PTL 1 is configured to provide a temperature sensor and a gas detection sensor in an exhaust path for guiding gas discharged from the secondary battery cell to the outside.

CITATION LIST

Patent Literature

PTL 1: International Publication No. WO 2013/069308

SUMMARY OF THE INVENTION

However, such an abnormality rarely occurs, so that the temperature sensor and the gas detection sensor provided in the exhaust path are unnecessary during normal use, and thus it is difficult to incur a lot of cost.

The present invention is made in view of such a background, and it is an object of the present invention to provide a power supply device capable of inexpensively detecting that gas at high temperature and under high pressure is discharged from a secondary battery cell, and a vehicle equipped with the power supply device.

The power supply device according to an exemplary embodiment of the present invention includes: a plurality of secondary battery cells each including a gas discharge valve for discharging internal gas; a plurality of voltage detection lines for detecting voltage of the corresponding plurality of secondary battery cells; a plurality of current fuses provided in the respective plurality of voltage detection lines to shut off current flow when currents flowing through the respective voltage detection lines exceed a predetermined value; and a gas guide path communicating with the gas discharge valve to discharge gas discharged from the gas discharge valve to the outside. At least one of the plurality of current fuses is disposed in the gas guide path, and is composed of a thermal fuse that shuts off current flow depending on temperature of the gas discharged from the gas discharge valve.

The above structure enables an abnormality to be detected by the thermal fuse when any of the secondary battery cells discharges gas at high temperature and under high pressure, while voltage of the secondary battery cells is monitored with the corresponding current fuses, and thus a fuse for detecting voltage can also detect gas discharge. This eliminates the need to add a separate detection mechanism for gas discharge, so that the structure can be simplified and costs can be reduced.

BRIEF DESCRIPTION OF DRAWINGS

FIG. 4A is a plan view of the power supply device of FIG. 3.

FIG. 4B is a schematic diagram illustrating a main path and a sub-path of the power supply device of FIG. 4A.

DESCRIPTION OF EMBODIMENTS

Figure 1:
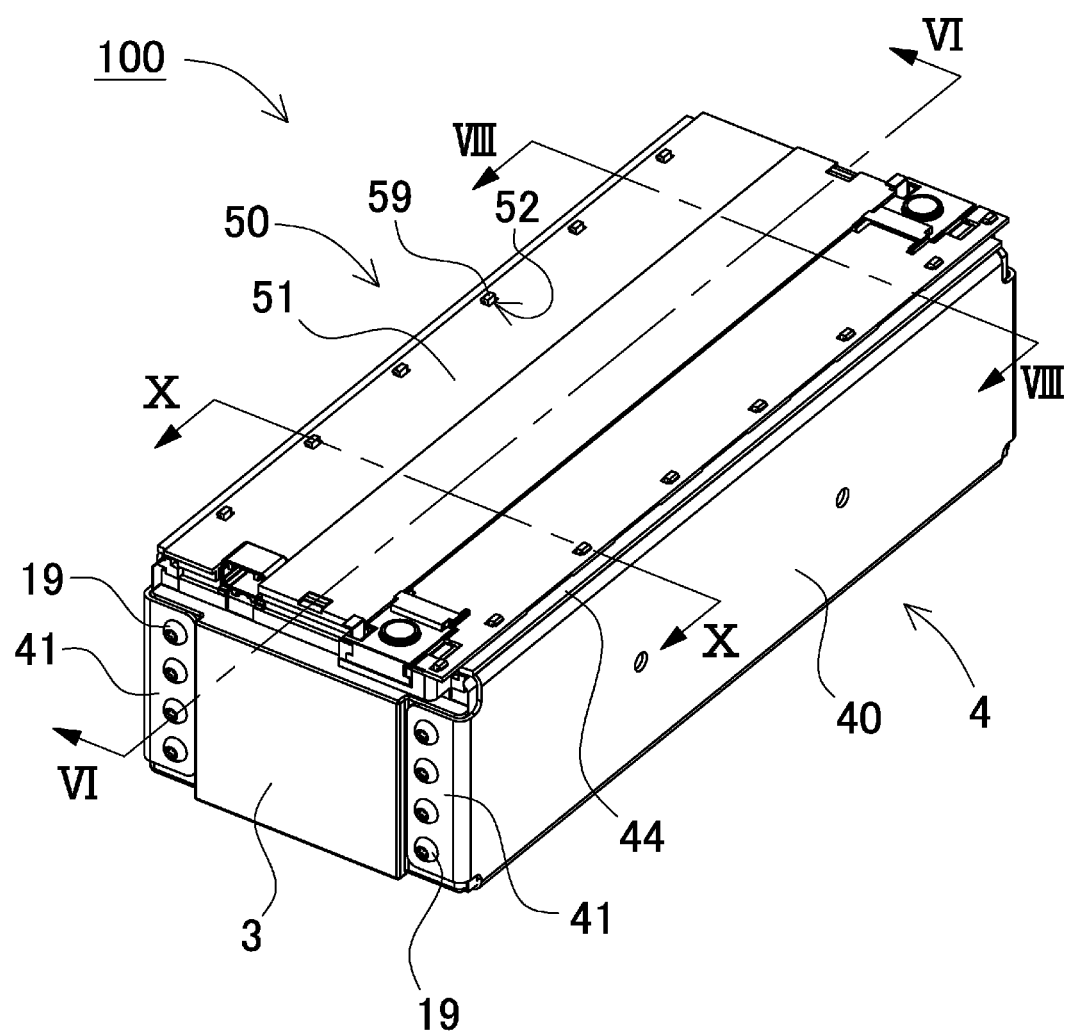
FIG. 1 is a schematic perspective view of a power supply device according to a first exemplary embodiment of the present invention.

The power supply device according to an exemplary embodiment of the present invention further includes a detection circuit for detecting an operating state of the thermal fuse, a power supply line connected to the plurality of secondary battery cells to supply power to the detection circuit, and a current fuse provided in the power supply line to shut off current flow when a current flowing through the power supply line exceeds a predetermined value. The current fuse provided in the power supply line is disposed in the gas guide path, and is configured not to shut off current flow depending on temperature of gas discharged from the gas discharge valve and to continue power supply to the detection circuit through the power supply line even when gas is discharged from the gas discharge valve.

The plurality of current fuses is disposed in the gas guide path, and any two or more of the plurality of current fuses are the thermal fuses, respectively. The above structure allows gas discharge to be detected by the two or more thermal fuses, and thus enables detection of the gas discharge to be improved in reliability by eliminating a case where any one of the thermal fuses malfunctions such as contact failure.

There is provided a cover part covering a battery stack in which the plurality of secondary battery cells is connected. The cover part is provided inside with the gas guide path partitioned. Each of the secondary battery cells includes an exterior can in a square shape having an outline with a thickness less than a width. The exterior can in a square shape has one surface provided with the gas discharge valve. The battery stack includes the plurality of secondary battery cells that are each in a square shape and are stacked while having surfaces that are each provided with the gas discharge valve and that are flush with each other. The gas guide path includes a main path in a linear shape, facing each gas discharge valve of the plurality of secondary battery cells, and one or more sub-paths communicating with the main path, which are provided above the plurality of secondary battery cells. The thermal fuse is disposed in the sub-path. The above structure enables avoiding a situation where the thermal fuse is directly exposed to gas at high temperature and under high pressure.

The sub-path is disposed parallel to the main path.

The thermal fuse is configured to shut off current flow at 300° C. or lower.

A vehicle according to an exemplary embodiment of the present invention includes the power supply device, a motor for traveling supplied with electric power from the power supply device, a vehicle body mounted with the power supply device and the motor, and wheels driven by the motor to allow the vehicle body to travel.

Hereinafter, exemplary embodiments of the present invention will be described with reference to the drawings. However, the exemplary embodiments described below are examples for embodying the technical idea of the present invention, and the present invention is not limited to the following. The present specification does not limit the members illustrated in the scope of claims to the members of the exemplary embodiments. In particular, dimensions, materials, shapes, relative placement, and the like of components described in the exemplary embodiments are not intended to limit the scope of the present invention to only those, and are merely explanatory examples unless otherwise specified. To clarify description, sizes and a positional relationship of members illustrated in each drawing may be exaggerated. In the following description, a member identical in name and reference numeral indicates an identical member or a member identical in quality, and detailed description thereof will be eliminated as appropriate. Each element constituting the present invention may be configured such that a plurality of elements is composed of one member to allow the one member to serve as the plurality of elements, or conversely, a function of one member may be achieved by sharing with the plurality of members.

The power supply device according to each exemplary embodiment is used for various applications including: a power source mounted on an electric vehicle such as a hybrid vehicle or an electric vehicle to supply electric power to a traveling motor; a power supply for storing generated power of natural energy such as solar power generation or wind power generation; a power source for storing midnight power; and the like, and is particularly used as a power source suitable for an application with a large amount of power and a large current.

First Exemplary Embodiment

Figure 2:
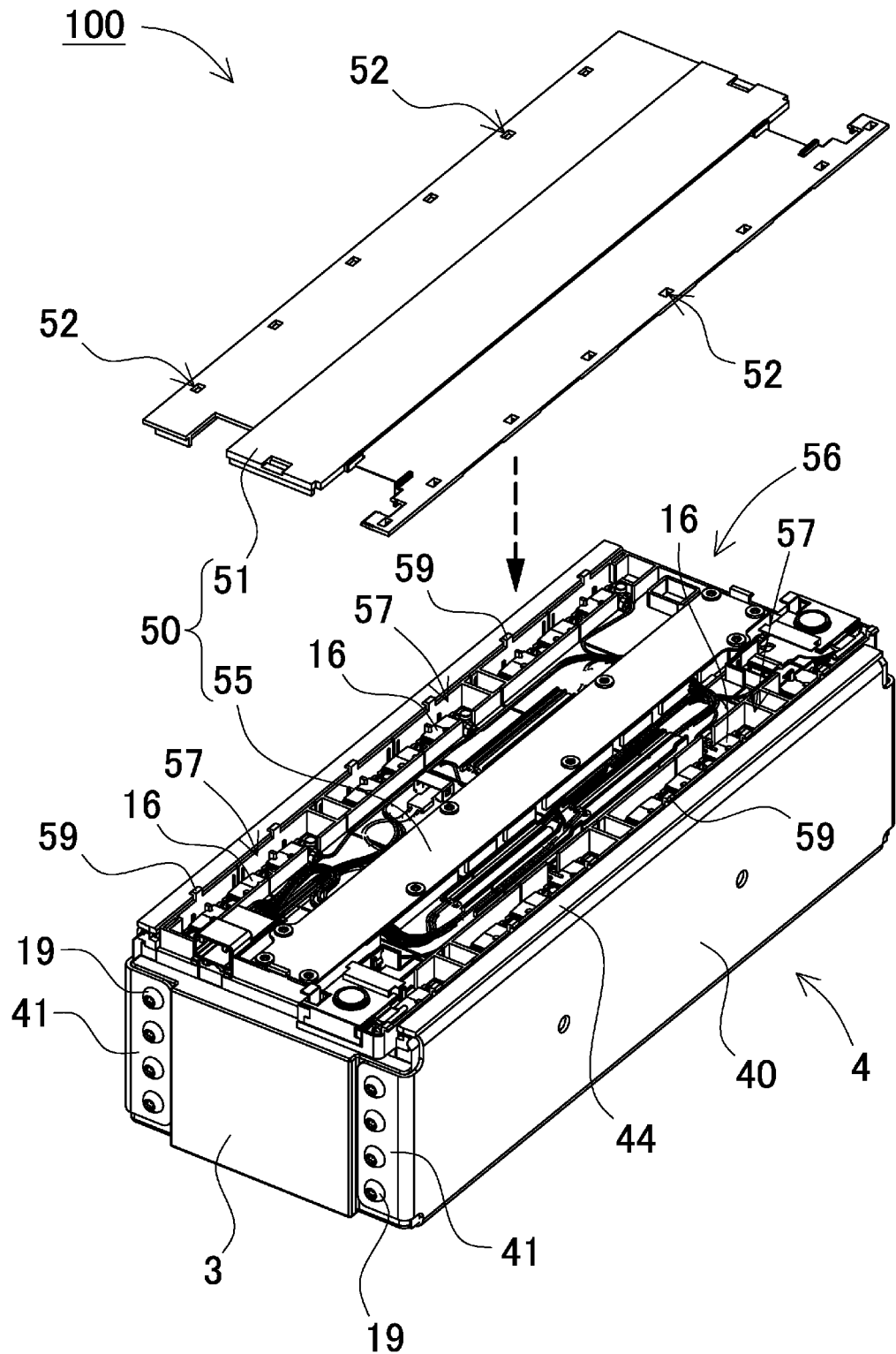
FIG. 2 is a perspective view illustrating a state in which an upper cover is removed from the power supply device of FIG. 1.
Figure 3:
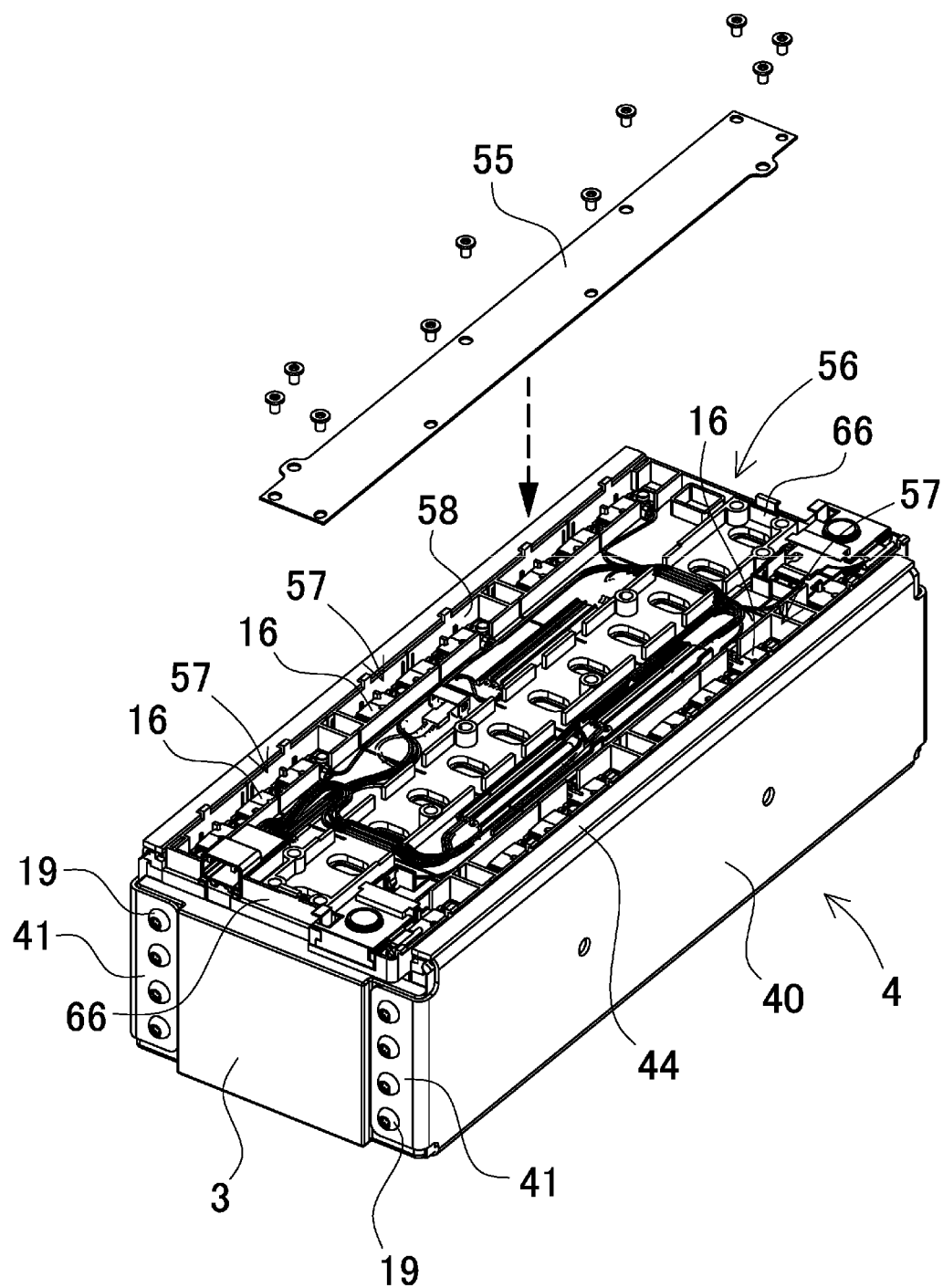
FIG. 3 is a perspective view illustrating a state in which a main-path cover is removed from the power supply device of FIG. 2.
Figure 5:
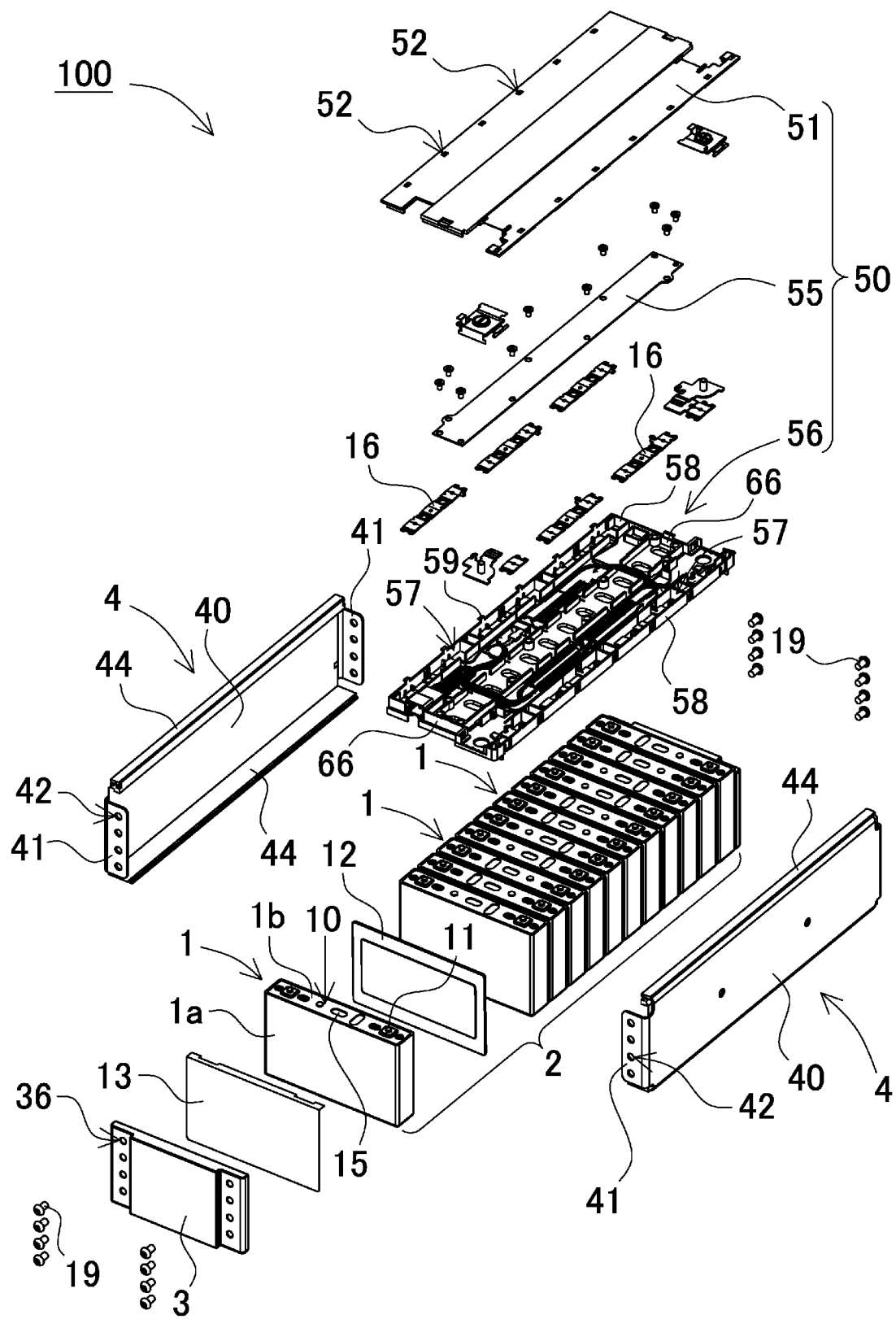
FIG. 5 is an exploded perspective view of the power supply device of FIG. 3.
Figure 6:
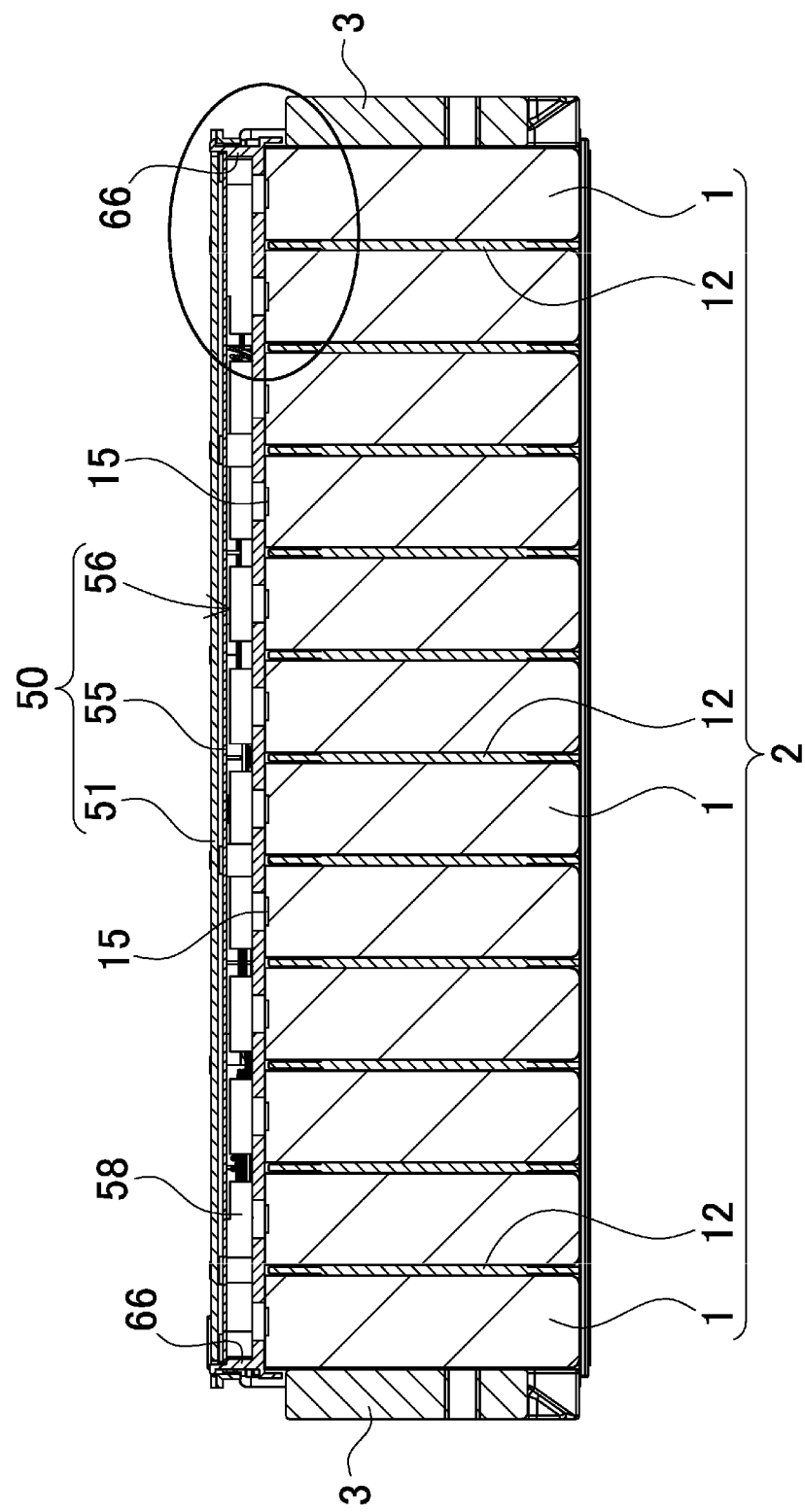
FIG. 6 is a longitudinal sectional view taken along line VI-VI in FIG. 1.
Figure 7:
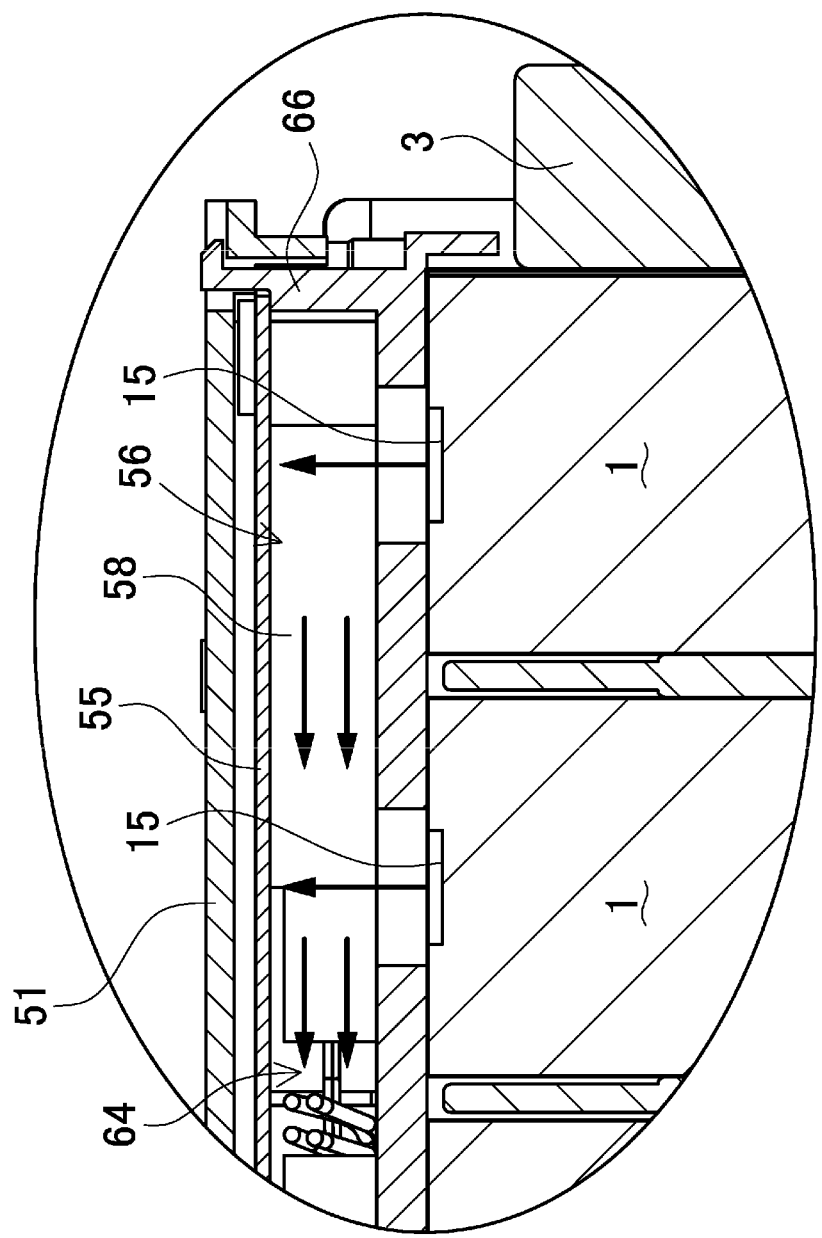
FIG. 7 is a partially enlarged view of FIG. 6.

FIGS. 1 to 5 each illustrate a power supply device according to a first exemplary embodiment of the present invention. In these drawings, FIG. 1 is a perspective view of power supply device 100, FIG. 2 is a perspective view of power supply device 100 of FIG. 1 with upper cover 51 removed, FIG. 3 is a perspective view of main-path cover 55 removed from FIG. 2, FIG. 4A is a plan view of power supply device 100 of FIG. 3 (with main-path cover 55 removed), FIG. 4B is a schematic view illustrating a main path and a sub-path of the power supply of FIG. 4A, and FIG. 5 is an exploded perspective view of power supply device 100 of FIG. 1. Power supply device 100 illustrated in these drawings includes battery stack 2 in which a plurality of secondary battery cells 1 is stacked, a pair of end plates 3 disposed at opposite ends of battery stack 2, and a pair of fastening members 4 connected at opposite ends to the respective pair of end plates 3 to fasten battery stack 2. Fastening members 4 each provided in power supply device 100 include body portion 40 disposed along a side surface of battery stack 2, and fixing portions 41 that are bent at opposite ends of body portion 40 and fixed to outer surfaces of respective end plates 3.

(Secondary Battery Cell 1)

As illustrated in FIG. 5, secondary battery cell 1 is a square battery having a width wider than a thickness, in other words, a prismatic battery thinner than the width, and is stacked in its thickness direction to form battery stack 2. Secondary battery cell 1 is a lithium ion secondary battery. However, the secondary battery cell may be any rechargeable secondary battery such as a nickel hydrogen battery or a nickel cadmium battery. Secondary battery cell 1 includes exterior can 1*a* that has a closed structure and houses positive and negative electrode plates together with an electrolyte solution. Exterior can 1*a* is formed by pressing a metal sheet such as aluminum or aluminum alloy into a rectangular shape, and has an opening that is hermetically sealed with sealing plate 1*b*. Sealing plate 1*b* is made of the same aluminum or aluminum alloy as that of exterior can 1*a*, and includes positive and negative electrode terminals 11 fixed to its opposite end portions. Sealing plate 1*b* is further provided with gas discharge valve 15 between positive and negative electrode terminals 11.

The plurality of secondary battery cells 1 is stacked in a thickness direction of each secondary battery cell 1, being set as the stacking direction, to form battery stack 2. The plurality of secondary battery cells 1 is each stacked by disposing terminal surface 10 provided with positive and negative electrode terminals 11 on the same plane to form battery stack 2.

(Separator 12)

As illustrated in FIG. 5, battery stack 2 includes secondary battery cells 1 stacked with separator 12 interposed therebetween. Separator 12 in the drawing is formed in the shape of a thin plate or sheet using an insulating material.

Separator 12 illustrated in the drawing has a plate shape that is substantially identical in size to a facing surface of secondary battery cell 1, and separator 12 is interposed between stacked secondary battery cells 1 adjacent to each other to insulate adjacent secondary battery cells 1 from each other. Although not illustrated, separator 12 may have a shape allowing a flow path of a cooling gas to be formed between secondary battery cell 1 and a spacer. Secondary battery cell 1 may have a surface covered with an insulating material. For example, exterior can 1a may have a surface excluding an electrode portion of the secondary battery cell, being heat-welded with a shrink tube of PET resin or the like.

(Battery Stack 2)

Battery stack 2 includes metal bus bar 16 connected to positive and negative electrode terminals 11 of adjacent secondary battery cells 1, and the plurality of secondary battery cells 1 is connected in series or in parallel, or in series and in parallel using bus bars 16. Battery stack 2 illustrated in the drawing includes twelve secondary battery cells 1 connected in series. However, the present invention does not specify the number of secondary battery cells constituting the battery stack and the connection state thereof.

(End Surface Spacer 13)

Battery stack 2 includes end plates 3 that are disposed on its opposite end surfaces with respective end surface spacers 13 interposed therebetween. As illustrated in FIG. 5, end surface spacer 13 is disposed between battery stack 2 and end plate 3 to insulate end plate 3 from battery stack 2. End surface spacer 13 may be made of a material similar to that of separator 12 described above.

(End Plate 3)

As illustrated in FIGS. 1 to 5, end plates 3 are disposed at opposite ends of battery stack 2 and are fastened using fastening members 4 disposed along both side surfaces of battery stack 2. End plates 3 are disposed at both the ends of battery stack 2 in the stacking direction of secondary battery cells 1 and outside respective end surface spacers 13 to sandwich battery stack 2 from both the ends. Each end plate 3 may have an upper end portion having higher rigidity than its central portion.

End plate 3 has a quadrangular outer shape, and is disposed facing the end surface of battery stack 2. End plate 3 illustrated in FIGS. 1 to 5 has an outer shape substantially identical to an outer shape of secondary battery cell 1. That is, end plate 3 illustrated in the drawings has a width in a left-right direction equal to a width of secondary battery cell 1 and a height in a vertical direction equal to a height of secondary battery cell 1. The present specification indicates the vertical direction that means a vertical direction in each drawing, and the left-right direction that means a left-right direction in each drawing and means a horizontal direction orthogonal to the stacking direction of the batteries.

End plate 3 illustrated in FIG. 5 is further formed with a plurality of through-holes for fixing end plate 3. For example, end plate 3 includes first through-hole 36 for inserting fastener 19 that fixes fixing portion 41 of fastening member 4. End plate 3 illustrated in the drawing includes a plurality of through-holes each opened as first through-hole 36. End plate 3 of FIG. 5 includes the plurality of first through-holes 36 provided at vertical intervals at respective positions in its both side portions facing fixing portion 41. End plate 3 of FIG. 5 is provided with three first through-holes 36 along each side, thus totaling to six first through-holes 36. This end plate 3 is configured such that fastener 19 passing through fixing portion 41 disposed on an outer peripheral surface of end plate 3 is inserted into each of first through-holes 36. Fastener 19 inserted into first through hole 36 is fixed to first through-hole 36 to fix fixing portion 41 at a predetermined position.

(Fastening Member 4)

As illustrated in FIGS. 1 to 5, fastening member 4 extends in the stacking direction of battery stack 2, and has opposite ends fixed to respective end plates 3 disposed on opposite end surfaces of battery stack 2. Then, battery stack 2 is fastened in the stacking direction using end plates 3. Fastening members 4 are each a metal sheet having a predetermined width along the side surface of battery stack 2 and a predetermined thickness, and are disposed facing both the respective side surfaces of battery stack 2. For fastening member 4, a metal sheet such as iron, preferably a steel plate can be used. Fastening member 4 made of a metal sheet is bent into a predetermined shape by press forming or the like.

Fastening member 4 includes body portion 40 disposed along a side surface of battery stack 2, and fixing portions 41 that are bent at opposite ends of body portion 40 and fixed to outer surfaces of respective end plates 3. Body portion 40 has a rectangular shape having a size covering almost the whole of battery stack 2 and end plates 3 disposed at opposite ends of battery stack 2. Body portion 40 illustrated in FIG. 1 is provided covering almost the whole area of the side surface of battery stack 2 without a gap. However, body portion 40 may be provided with one or more openings to expose a part of the side surface of the battery stack. To fix opposite ends of fastening member 4 to the respective pair of end plates 3, fastening member 4 includes fixing portions 41 that are each formed by bending each of opposite end portions of fastening member 4 along an outer surface of end plate 3 at each of opposite ends of fastening member 4. Fixing portions 41 illustrated in the drawing are each substantially equal in vertical height to body portion 40 and end plate 3, and are provided covering left and right side portions of respective end plates 3. This fastening member 4 is fixed to end plate 3 using fastener 19 inserted into through-hole 42 provided in a leading end portion of fixing portion 41. Fastening member 4 illustrated in the drawing further includes bent portions 44 that are each provided along an upper end portion of an intermediate portion excluding opposite end portions of body portion 40 to hold an upper surface and a lower surface of battery stack 2. Bent portions 44 hold upper surfaces and lower surfaces of secondary battery cells 1 constituting battery stack 2 to prevent terminal surface 10 of each secondary battery cell 1 from being vertically displaced in position.

Although not illustrated, fastening member 4 may include an insulating sheet disposed on inner surfaces of body portion 40 and bent portion 44 so that the insulating sheet can insulate secondary battery cell 1 of battery stack 2 from fastening member 4. Although not illustrated, fastening member 4 may also include a cushioning material on each of inner surfaces of the opposite end portions of body portion 40 to protect opposite side surfaces of end plate 3 from shock such as vibration.

(Cover Part 50)

As illustrated in FIG. 5, power supply device 100 includes cover part 50 covering the upper surface of battery stack 2. Cover part 50 is provided partitioning gas guide path 60 inside cover part 50 to discharge gas discharged from gas discharge valve 15 to the outside of cover part 50. In this way, cover part 50 also serves as a gas duct for discharging gas, so that a labor of separately preparing a gas duct and piping it to a holder as in conventional cases can be saved, and thus has advantages of simplification of structure, weight reduction, and cost reduction. This cover part 50 includes holder part 56, main-path cover 55, and upper cover 51.

(Holder Part 56)

As illustrated in FIG. 5, holder part 56 is provided on its upper surface with bus bar holding parts 57 for holding bus bars 16. When holder part 56 is placed on the upper surface of battery stack 2 with bus bars 16 disposed on respective bus bar holding parts 57, respective bus bars 16 can be positioned with respect to the corresponding secondary battery cells. Holder part 56 also includes wall portion 58 erected partitioning gas guide path 60. Using cover part 50 defining gas guide path 60 as a bus bar holder holding bus bars 16 as described above enables further simplification of the structure. Holder part 56 is preferably formed of an insulating resin so that battery stack 2 is not short-circuited. As described above, holder part 56 defines gas guide path 60, so that the insulating resin forming holder part 56 preferably has heat resistance.

(Wall Portion 58)

Holder part 56 includes wall portions 58 erected partitioning gas guide path 60. Gas guide path 60 partitioned by wall portions 58 opens upward. When an upper surface of holder part 56 is covered with cover part 50, gas guide path 60 is closed from above. Holder part 56 includes main path 61 and sub-path 62 defined by wall portions 58 as gas guide path 60.

(Main Path 61)

Main path 61 is formed linearly facing gas discharge valve 15 of each of secondary battery cells 1 stacked. The battery stack 2 includes a plurality of secondary battery cells 1 that are each in a square shape and are stacked while having surfaces that are each provided with gas discharge valve 15 and are flush with each other. Gas discharge valve 15 is disposed substantially in the center of sealing plate 1b of each secondary battery cell 1. Thus, when main path 61 is disposed substantially in the center in a lateral direction of holder part 56 extended in a rectangular shape as illustrated in FIG. 4A and the like, each gas discharge valve 15 can communicate with main path 61 when opened. Main path 61 also communicates with sub-path 62, and communicates with exhaust port 63 through sub-path 62. Exhaust port 63 is an opening for discharging gas from cover part 50 to the outside.

(Sub-Path 62)

One or more sub-paths 62 are provided substantially parallel to main path 61. One or more sub-paths 62 are disposed on both sides across main path 61 disposed in the center of cover part 50. FIG. 4B illustrates an example in which two sub-paths 62 including first sub-path 62A and second sub-path 62B are provided above and below main path 61, respectively. Including sub-path 62 in gas guide path 60 as described above enables gas momentum to be reduced by increasing a path length more than when main path 61 is alone.

(Main-Path Cover 55)

Main path 61 is formed in an elongated shape extending in the stacking direction of secondary battery cells 1. Main path 61 is covered with main-path cover 55 from above. Main-path cover 55 is preferably made of a metal sheet. Main-path cover 55 is disposed at a position facing gas discharge valves 15 of the plurality of battery cells constituting battery stack 2, and thus is to be directly sprayed with high-pressure gas discharged from gas discharge valve 15. The metal sheet has higher heat transfer property than heat-resistant resin, so that the above structure enables high-pressure gas discharged from gas discharge valve 15 to be effectively reduced in temperature by transferring heat of the high-pressure gas to main-path cover 55 formed of the metal sheet. The metal sheet also has higher strength than the heat-resistant resin, so that deformation due to high-pressure gas can be reduced.

Although the above exemplary embodiment has a structure in which main-path cover 55 extends only above main path 61 and wall portion 58 of holder part 56 extends laterally to main path 61, the present invention is not necessarily limited to this structure. Specifically, main-path cover 55 may have a shape extending not only above main path 61 but also laterally to main path 61. This structure enables main-path cover 55 to be improved in rigidity and heat capacity.

(Upper Cover 51)

Power supply device 100 illustrated in FIG. 1 has an upper surface on which upper cover 51 is disposed. Upper cover 51 is made of a material having excellent insulating properties, such as resin. Main-path cover 55 made of metal is disposed in a central portion as illustrated in FIG. 2 that is a perspective view of power supply device 100 of FIG. 1 with upper cover 51 removed. Cover part 50 includes main-path cover 55 and upper cover 51 that define gas guide path 60 together with holder part 56 as illustrated in the perspective view of FIG. 3 illustrating the state in which main-path cover 55 is removed from FIG. 2 and the plan view of FIG. 4A in which main-path cover 55 is removed from FIG. 3.

(Horizontal Gas Flow Bending Portion 64)

Gas guide path 60 includes one or more horizontal gas flow bending portions 64 that bend at least a flow direction of some of gas in plan view of cover part 50. As a result, even when gas at high temperature and under high pressure is discharged from any of secondary battery cells 1, a flow of the gas is bent in horizontal gas flow bending portion 64 to be reduced in momentum and temperature until the gas discharged from gas discharge valve 15 is discharged to the outside of cover part 50 through gas guide path 60. Then, the gas reduced in pressure and temperature is discharged form power supply device 100. This enables obtaining an advantage of improving safety.

The perspective view of FIG. 3 illustrates a path through which gas discharged from gas discharge valve 15 of secondary battery cell 1 is discharged from exhaust port 63, the path being indicated by arrows. When gas guide path 60 is formed to cause a flow of gas to be bent multiple times before the gas is exhausted, as described above, safety can be improved by reducing momentum of the gas and also temperature thereof. Although FIG. 3 indicates the arrows for only sub-path 62 above main path 61 for description, it goes without saying that the same applies to the sub-path below main path.

(Vertical Gas Flow Bending Portion 65)

Gas guide path 60 further includes vertical gas flow bending portion 65. Vertical gas flow bending portion 65 bends at least a flow direction of some of gas in longitudinal sectional view of cover part 50. When gas guide path 60 is formed in a three-dimensional manner to allow vertical gas flow bending portion 65 in addition to horizontal gas flow bending portion 64 to further bend the gas at high temperature and under high pressure to increase the number of bends and change a bending direction, effect of reducing pressure of the gas and cooling the gas can be enhanced.

(Details of Horizontal Gas Flow Bending Portion 64)

Horizontal gas flow bending portion 64 is formed in wall portion 58 defining main path 61. Examples of FIGS. 4A and 4B, and the like each show horizontal gas flow bending portion 64 that is composed of a plurality of openings formed in wall portion 58. The openings of horizontal gas flow bending portion 64 allow main path 61 and sub-path 62 to communicate with each other.

Horizontal gas flow bending portion 64 is provided not only in wall portion 58 that separates main path 61 and sub-path 62, but also in a wall portion that separates a sub-path and a sub-path. In the example of FIG. 4B, first opening 64a is formed in first wall portion 58A that separates main path 61 and first sub-path 62A, and second opening 64b is formed in second wall portion 58B that separates first sub-path 62A and second sub-path 62B. First opening 64a and second opening 64b are formed with an offset to be prevented from aligning with an orthogonal line orthogonal to an extension direction of main path 61 and sub-path 62. This structure enables avoiding a situation in which high-pressure gas having moved from main path 61 to first sub-path 62A through first opening 64a directly moves to second sub-path 62B through second opening 64b. That is, the high-pressure gas having moved to first sub-path 62A is required to flow through first sub-path 62A and further move to second sub-path 62B after bending at second opening 64b. Forcing the high-pressure gas to bend enables further reducing momentum of the gas to reduce pressure of the gas.

Similarly, second opening 64b and exhaust port 63 are formed with an offset to be prevented from aligning with an orthogonal line orthogonal to the extension direction of main path 61 and sub-path 62. This enables avoiding a situation in which gas having moved to second sub-path 62B through second opening 64b is directly discharged to the outside of the power supply device through exhaust port 63. This also forces a flow direction of the gas to bend in exhaust port 63 after the gas flows through second sub-path 62B, so that the gas can be further reduced in pressure. Repeating this kind of bending enables obtaining effect of reducing not only momentum of the gas to reduce pressure of the gas, but also temperature of the gas. Then, the gas discharged from gas discharge valve 15 of secondary battery cell 1 at high temperature and under high pressure decreases in pressure and temperature while flowing through the gas guide path. This causes the gas to be considerably weakened when it is discharged from the power supply device, so that safety can be improved.

(Details of Vertical Gas Flow Bending Portion 65)

As described above, cover part 50 includes upper cover 51. Upper cover 51 is provided covering gas guide path 60 including the upper surface of main-path cover 55 from above as illustrated in FIGS. 1 and 2. This structure enables cover part 50 to also serve as a gas duct for discharging gas. Upper cover 51 is further provided on its bottom surface side with vertical gas flow bending portion 65. This vertical gas flow bending portion 65 is disposed in sub-path 62. Vertical gas flow bending portion 65 is formed on the bottom surface side of upper cover 51 as illustrated in the sectional view of FIG. 8. Additionally, a gap is formed between an end edge of vertical gas flow bending portion 65 and a floor surface of gas guide path 60. This structure enables gas guide path 60 to be changed in its height direction using vertical gas flow bending portion 65 protruding downward from an upper side of gas guide path 60. Thus, when gas guide path 60 bent in three dimensions is defined to bend a flow path of gas, a pressure loss can be generated. This enables reduction in flow velocity and temperature of the gas.

Figure 8:
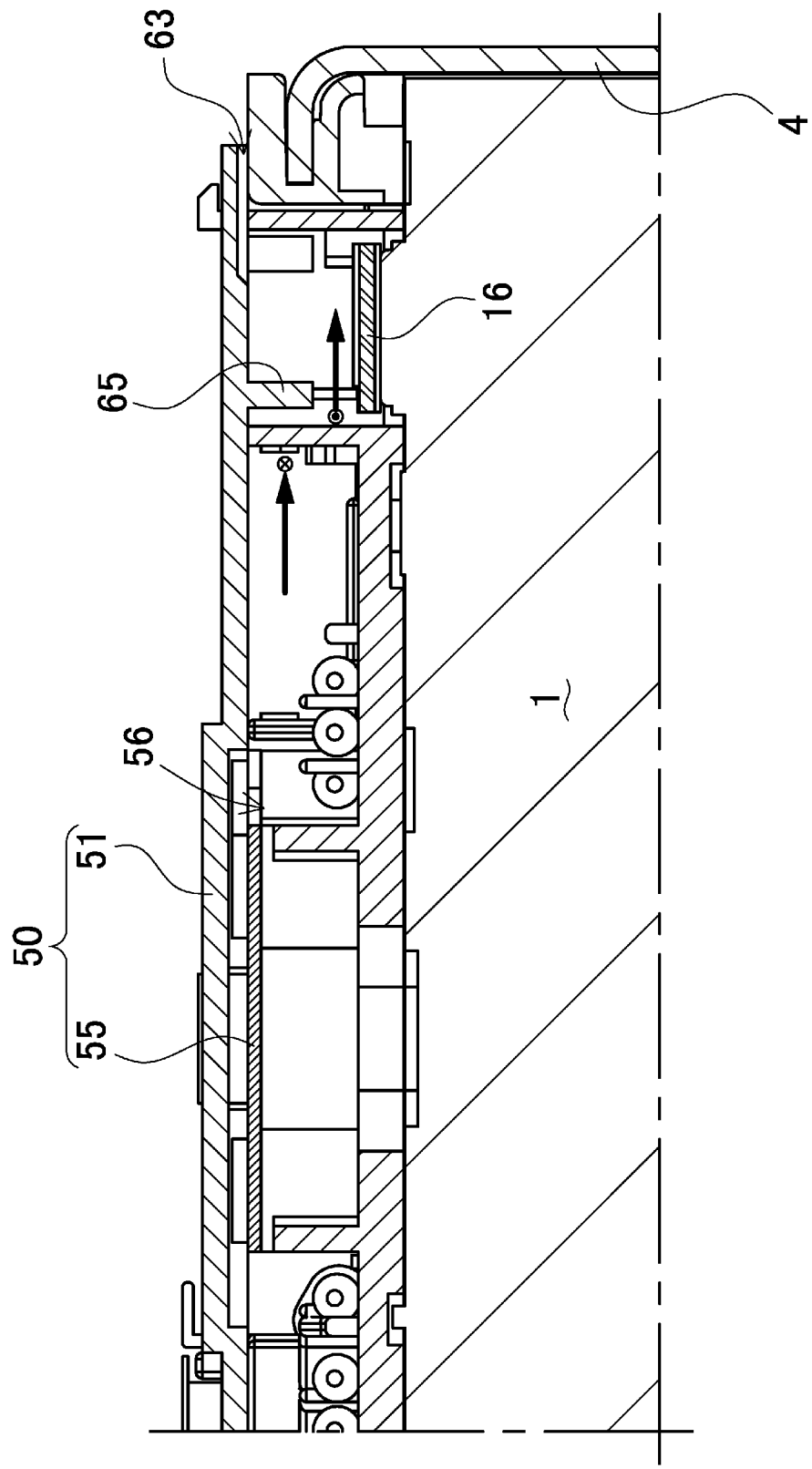
FIG. 8 is an enlarged sectional view of a main part taken along line VIII-VIII in FIG. 1.
Figure 9:
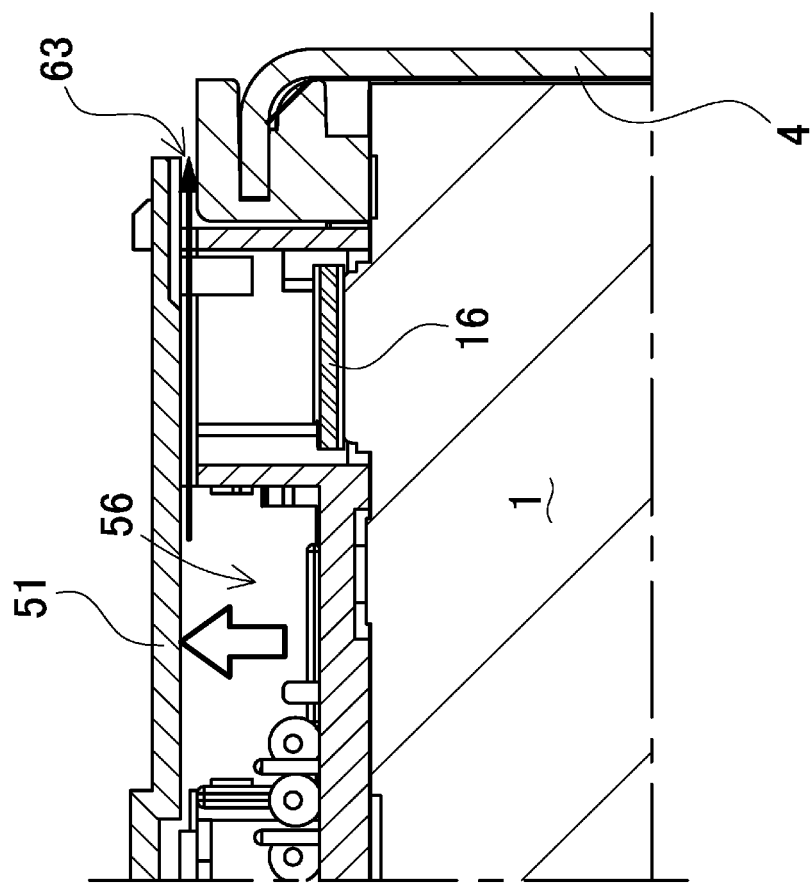
FIG. 9 is a schematic sectional view illustrating a state in which high-pressure gas is ejected in a structure without a vertical gas flow bending portion on a back surface side of an upper cover.

As illustrated in the sectional view of FIG. 8, gas guide path 60 is composed of not only vertical gas flow bending portion 65 protruding from a back surface of upper cover 51, but also wall portion 58 protruding upward from a bottom surface of holder part 56. Wall portion 58 has an upper end in contact with the bottom surface of upper cover 51. This structure enables avoiding a situation in which gas is linearly discharged to exhaust port 63. When main-path cover 55 and upper cover 51 are pushed up due to high-pressure gas ejected upward from gas discharge valve 15 in a structure provided with no vertical gas flow bending portion 65 on a back surface side of upper cover 51 as illustrated in the sectional view of FIG. 9, a gap may be formed between wall portion 58 and the bottom surface of upper cover 51, defining main path 61. Thus, it is conceivable that high-pressure gas may flow linearly to exhaust port 63 through the gap to be discharged to the outside of the power supply device while maintaining high pressure.

Figure 10:
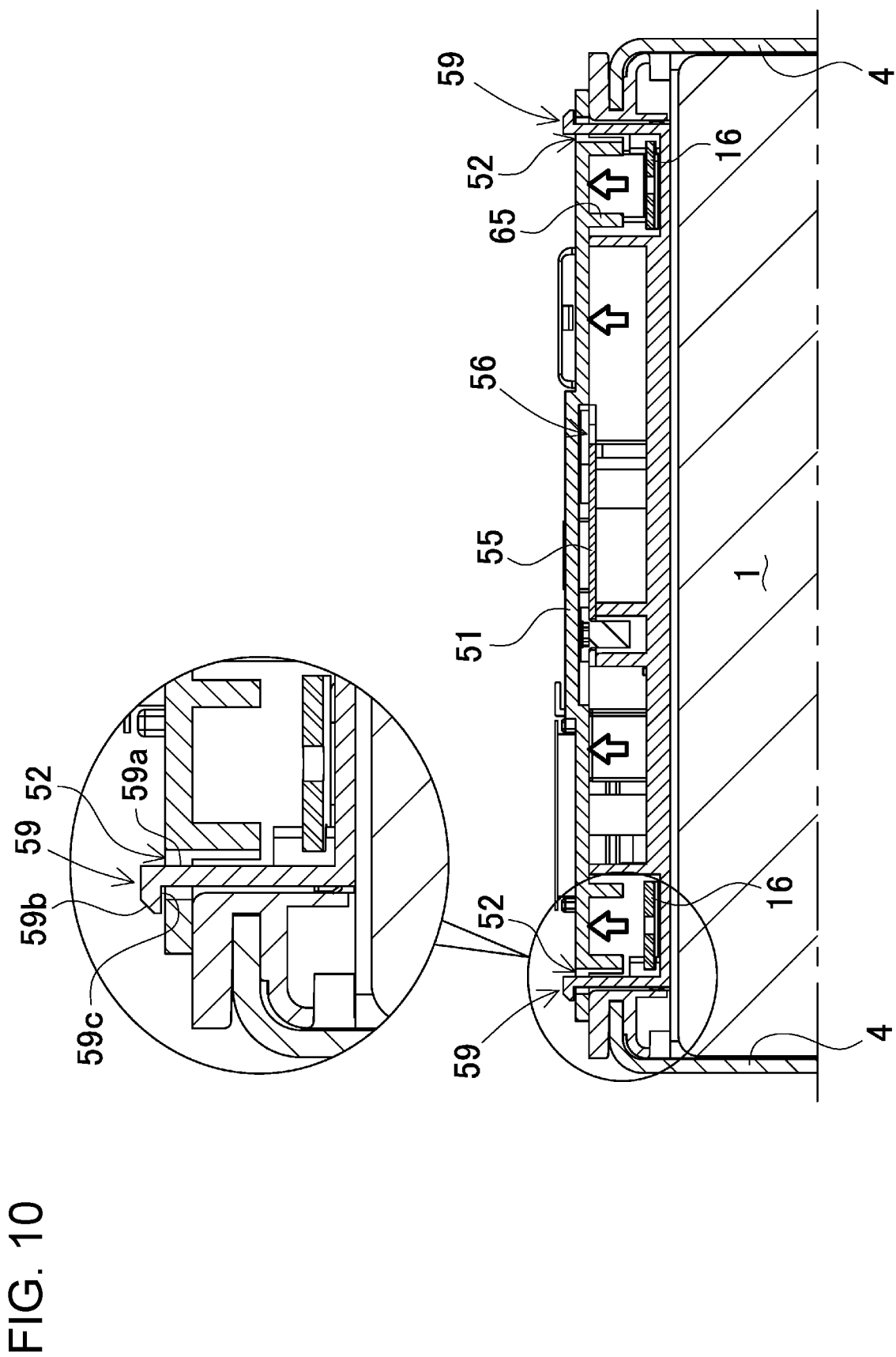
FIG. 10 is an enlarged sectional perspective view of a main part taken along line X-X in FIG. 1.

In contrast, when vertical gas flow bending portion 65 is provided protruding downward from a back surface of an upper case as illustrated in FIGS. 8 and 10 and even when a gap is formed between the upper end of wall portion 58 and the bottom surface of upper cover 51 during gas discharge, vertical gas flow bending portion 65 inhibits high-pressure gas having entered sub-path 62 from main path 61 through the gap from flowing linearly, and then the gas temporarily flows toward a bottom surface of sub-path 62. The gas flow bent toward the bottom surface of sub-path 62 flows toward exhaust port 63, so that a direction of the gas flow needs to be further changed to an upward direction. When vertical gas flow bending portion 65 is provided as described above, the gas flow cannot reach exhaust port 63 unless a direction of fluid is changed at least twice. Then, forced multiple changes of a flow direction of the fluid as described above cause pressure loss to reduce pressure of the fluid. When a discharge path of gas is lengthened, not only the pressure further decreases but also the amount of decrease in temperature of the gas increases. Further, effect of trapping sparks contained in the gas and preventing them from leaking to the outside from the power supply device is also enhanced. Additionally, lengthening of gas guide path 60 using vertical gas flow bending portion 65 can be applied to not only when a gap is formed between the upper case and wall portion 58 due to expansion of the upper case, but also when no gap is formed. As described above, when a flow direction of a gas flow is changed in a vertical direction using vertical gas flow bending portion 65 in addition to change in direction of the gas flow to a horizontal direction using horizontal gas flow bending portion 64 described above, gas guide path 60 is increased in path length. This contributes to reduction in pressure of the gas.

(Exhaust Port 63)

As described above, cover part 50 is formed with exhaust port 63 for discharging gas guided from gas discharge valve 15 to gas guide path 60 to the outside of power supply device 100. Exhaust port 63 is formed in a direction intersecting the stacking direction of secondary battery cells 1.

Gas guide path 60 includes end surface walls 66 disposed on opposite end sides of secondary battery cell 1 in the stacking direction. In other words, no gas exhaust port 63 is provided in opposite end surfaces of cover part 50 in its longitudinal direction. The structure formed as describe above prevents a situation in which high-pressure gas guided to main path 61 escapes to its opposite ends side with high pressure maintained. When the structure is formed in cover part 50, safety can be improved by discharging the high-pressure gas to the outside after the high-pressure gas is caused to flow through gas guide path 60 while causing pressure loss and weakening momentum. The high-pressure gas contains not only gas but also solids or liquid ejecta, and these ejecta have higher straightness than gas. Thus, the above structure prevents the solids or liquid ejecta from flowing out to sub-path 62, and the pressure is high.

Holder part 56 includes bus bar holding part 57 for holding bus bar 16, being disposed in sub-path 62 facing exhaust port 63. In other words, bus bar 16 is configured to be disposed in front of exhaust port 63 in gas guide path 60. This structure allows gas exhausted from gas discharge valve 15 to be brought into contact with bus bar 16 made of metal before being discharged to the outside of power supply device 100 from exhaust port 63, so that heat of the gas is transferred to bus bar 16. This enables decrease in temperature, so that effect of improving safety can be obtained by reducing temperature when the gas is discharged to the outside of the power supply device.

(Locking Hook 59)

Upper cover 51 has opposite ends fixed to holder part 56. Holder part 56 is provided on its opposite ends with respective locking hooks 59. Then, upper cover 51 is formed with locking hole 52 configured to lock locking hook 59. As illustrated in FIG. 2, gas guide path 60 defined by wall portion 58 in the upper surface of holder part 56 opens upward. Upper cover 51 is fixed to the upper surface of holder part 56 using a locking structure, closing the upper surface of holder part 56. Upper cover 51 is configured not to come off even when upper cover 51 swells slightly due to pressure of gas during gas discharge. This state is illustrated in the sectional view of FIG. 10.

Holder part 56 locks upper cover 51 with locking hook 59 to close gas guide path 60 from above using upper cover 51. Locking hook 59 includes a claw portion projecting upward in each of side surface regions on opposite sides of holder part 56, parallel to the stacking direction of secondary battery cells 1. This claw portion is formed in a claw shape, and includes vertical surface 59a formed substantially vertically and inclined surface 59b inclined laterally from an upper portion. Inclined surface 59b is formed widening toward the outside of holder part 56. Additionally, locking surface 59c is horizontally formed extending from a lower end of inclined surface 59b of the claw portion at an acute angle. This claw portion is formed in an L shape bent outward of holder part 56 as illustrated in the sectional view of FIG. 10.

Then, upper cover 51 includes locking hole 52 opened in its side surface corresponding to locking hook 59, into which the claw portion of locking hook 59 is inserted. Locking hook 59 is inserted into locking hole 52, and locking surface 59c of the claw portion is brought into contact with a region located outside upper cover 51 within an open end edge of locking hole 52, and then cover 51 is locked to holder part 56. This structure enables upper cover 51 to be reliably connected to holder part 56, and thus upper cover 51 is configured to be less likely to come off due to pressure of high-pressure gas, especially during gas discharge. When gas is discharged and internal pressure is applied to upper cover 51 to cause upper cover 51 to be deformed swelling upward, this deformation acts in a direction in which locking hook 59 and locking hole 52 are more locked. As a result, upper cover 51 is maintained in a firmly connected state to prevent upper cover 51 from falling off, for example.

(Current Fuse 70)

Figure 11:
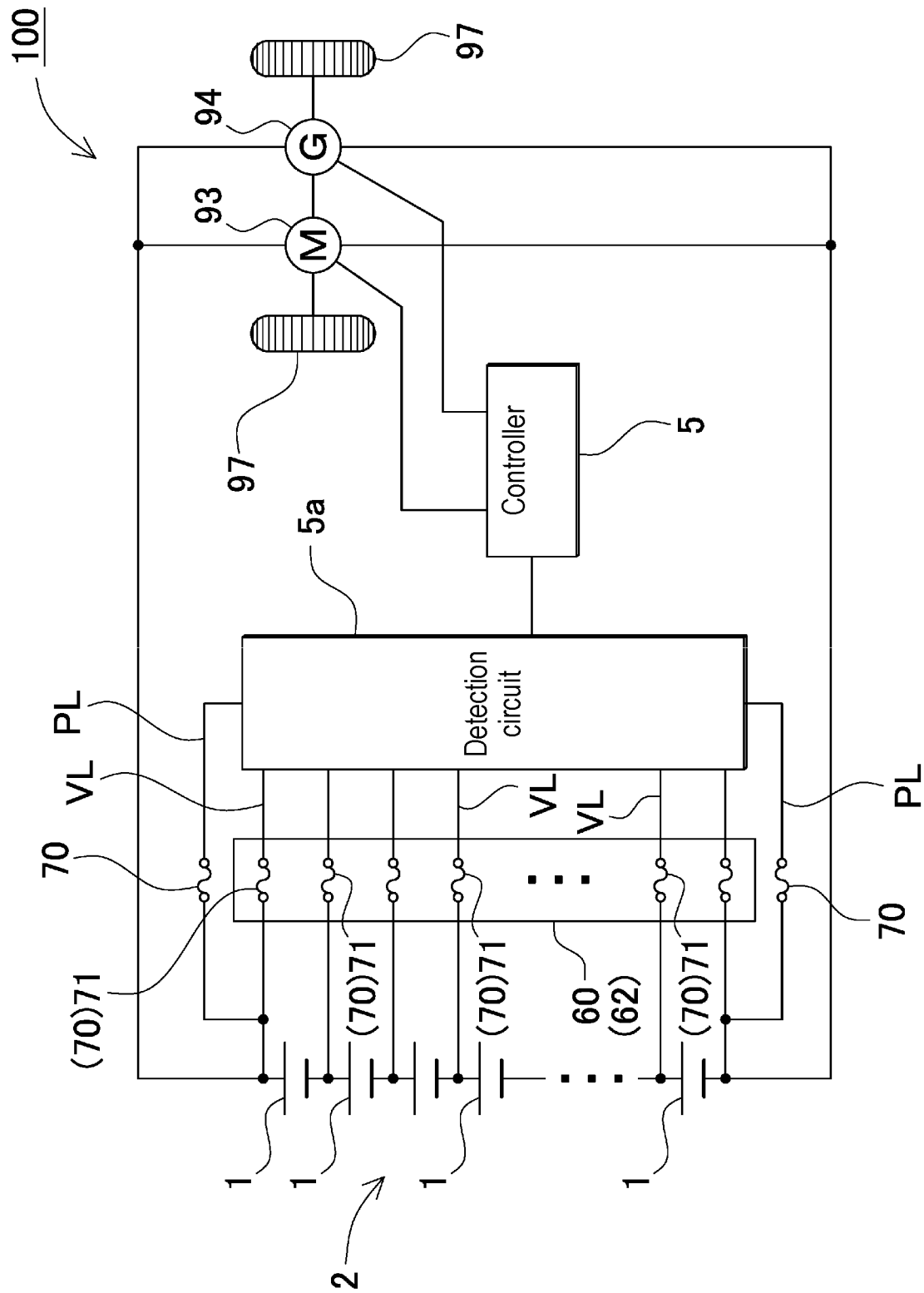
FIG. 11 is a block diagram of a power supply device provided with a current fuse.

The power supply device illustrated in FIG. 4A includes a plurality of voltage detection lines that is connected to a detection circuit (not illustrated) and disposed on the upper surface of holder part 56. Here, a block diagram of the power supply device is illustrated in FIG. 11. This power supply device is configured such that voltage detection lines VL are connected to corresponding bus bars 16 to enable potential of respective bus bars 16 to be acquired. Each voltage detection line VL is connected to detection circuit 5a, and voltage of each secondary battery cell 1 can be measured using detection circuit 5a. Detection circuit 5a has high impedance, so that a large current does not normally flow through voltage detection lines VL. However, a large current may flow due to some abnormality. Thus, the power supply device of the above exemplary embodiment includes current fuse 70 provided in each voltage detection line VL. Current fuse 70 is configured to be fused by a large current, flowing when an abnormal state occurs, to shut off the current.

(Thermal Fuse 71)

Any of such current fuses 70 can be used not only for detecting a current in secondary battery cell 1 but also for detecting discharge of high-temperature gas from secondary battery cell 1. That is, at least one of current fuses 70 is disposed in gas guide path 60, and serves as thermal fuse 71 that shuts off current flow depending on temperature of gas discharged from gas discharge valve 15 of secondary battery cell 1. Thermal fuse 71 has a characteristic of being fused even when a large current flows, so that a threshold value can be set for each of temperature and current. The above structure is configured to dispose thermal fuse 71 serving as current fuse 70 in gas guide path 60, so that thermal fuse 71 is fused depending on temperature of high-pressure gas when the high-pressure gas is guided to gas guide path 60. Monitoring an operating state of thermal fuse 71 enables detection of gas discharge.

Examples of a method for monitoring the operating state of such a thermal fuse include a method for monitoring input from the voltage detection line. Unfortunately, this method causes an identical detection result to be obtained for when the thermal fuse is fused and when the voltage detection line is disconnected, so that the detection result is less likely to be distinguished.

Thus, the present exemplary embodiment includes at least two or more thermal fuses 71 disposed in gas guide path 60. This structure is configured such that although the plurality of voltage detection lines VL is extremely unlikely to be disconnected at the same time, and the plurality of thermal fuses 71 are fused almost at the same time when high-pressure gas flows into gas guide path 60. Thus, the above structure enables distinguishing between when thermal fuse 71 is fused and when voltage detection line VL is disconnected, depending on the number of abnormality detections.

In the power supply device illustrated in FIG. 4A, wiring disposed on the upper surface of holder part 56 is not limited to the voltage detection line. In general, detection circuit 5a is configured to acquire power for ICs and circuit elements constituting detection circuit 5a from the secondary battery cell to be monitored. Thus, wiring disposed on the upper surface of holder part 56 also includes power supply line PL of detection circuit 5a. Although current fuse 70 described above is also provided in power supply line PL, this current fuse 70 cannot be replaced with thermal fuse 71. If a thermal fuse is provided in the power supply line, the power supply line will be shut off when high-pressure gas is guided to the gas guide path. This is because a detection circuit for monitoring an operating state of the thermal fuse is typically configured to be driven by power supplied from a power supply line, and thus cannot monitor the operating state of the thermal fuse when the power supply line is shut off. Thus, an element having a characteristic of not being fused by high-pressure gas is preferably used for current fuse 70 to be provided in power supply line PL.

(Detection Circuit 5a)

Detection circuit 5a is connected to thermal fuse 71 to detect gas discharge and notify controller 5 of the gas discharge. FIG. 11 shows an example in which the detection circuit is composed of an operation amplifier. Detection circuit 5a may be integrated with controller 5. Additionally, there is preferably provided a protective structure for protecting a supply line for supplying a drive current to detection circuit 5a from gas flowing through gas guide path 60. This structure allows detection circuit 5a that performs detection operation during gas discharge to have a power source with a robust structure that is less likely to be affected by high temperature and high pressure of gas, and enables the detection operation at the time of abnormality to be reliably performed. As such a protective structure, the supply line is disposed outside gas guide path 60, for example. Alternatively, a physical protective structure such as thickening the supply line or coating the periphery of the supply line with a heat-resistant member may be provided.

Additionally, some current fuses may not be placed in the gas guide path or may be current fuses that do not react to temperature of gas, i.e., that are not thermal fuses. When a current fuse that does not react during gas discharge is secured as described above, maintaining stable operation of the detection circuit is ensured.

When thermal fuse 71 and a harness connecting thermal fuse 71 are disposed in gas guide path 60, effect of obstructing a gas flow flowing there to reduce gas pressure also can be expected. Although thermal fuse 71 may be arranged in main path 61 of gas guide path 60, thermal fuse 71 is preferably disposed in the sub-path as illustrated in FIG. 4A. This structure enables stable operation by avoiding a situation in which thermal fuse 71 is directly exposed to gas at high temperature and under high pressure discharged from gas discharge valve 15.

Thermal fuse 71 has an operating temperature that is set in accordance with temperature of gas discharged from gas discharge valve 15. Thermal fuse 71 is designed to react at 300° C., for example. The operating temperature is preferably lowered to 200° C., and more preferably 150° C.

As described above, current fuse 70 can also be used as thermal fuse 71 to monitor secondary battery cell 1. Thus, when the amount of current flowing to secondary battery cell 1 exceeds a predetermined value, the current flow can be shut off.

(Main Path 61)

A state in which gas discharge valve 15 of any of secondary battery cells 1 is opened to discharge gas in power supply device 100 of FIGS. 4A to 7 is considered. Gas exhausted from secondary battery cell 1 is received by main path 61 of gas guide path 60 provided in the upper surface of secondary battery cell 1 as illustrated in the vertical sectional view of FIG. 7. Gas guide path 60 has a top surface composed of main-path cover 55 made of metal, and an upper surface of main-path cover 55 is covered with upper cover 51. Thus, gas guide path 60 can sufficiently withstand gas pressure. Gas discharged vigorously upward from gas discharge valve 15 is received by a large area of main-path cover 55 and loses a considerable amount of pressure. At this time, heat of the gas is also absorbed by main-path cover 55 made of metal and a side surface of the main path, and the gas is reduced in temperature.

Here, main path 61 of gas guide path 60 has a sectional area equal to or larger than an opening area of gas discharge valve 15. This prevents gas discharge from gas discharge valve 15 from being inhibited by residence of gas when the gas discharged from gas discharge valve 15 is guided to main path 61. Main path 61 has a sectional area that is defined by vertical and horizontal dimensions when main path 61 has a rectangular section.

(Sub-Path 62)

When gas is guided to main path 61 as described above, the gas is dispersed in main path 61 and discharged to sub-path 62. At this time, a bent path formed in main path 61 causes the gas to be meandered so that sparks contained in the gas are not discharged to the outside of the power supply device.

Burning fine particles have a mass, so that the sparks in the gas tries to go straight due to inertia caused by movement of the gas under high pressure during gas discharge. As a result, momentum of the gas is reduced by bending gas guide path 60, and thus heat of the gas is also reduced. As described above, the high-pressure gas contains unburned gas and sparks having already ignited, and the sparks are prevented from being discharged from the power supply device by reducing momentum of the sparks in a path from gas discharge valve 15 to exhaust port 63 of the power supply device using a property of having a larger inertia than the gas, and are also reduced in temperature to improve safety.

The above power supply device can be used as a vehicle-mounted power source. As a vehicle equipped with the power supply device, an electric vehicle such as a hybrid vehicle or a plug-in hybrid vehicle that travels using both an engine and a motor, and an electric vehicle that travels using only a motor can be used, and the power supply device is used as a power source for these vehicles. As an example, power supply device 1000 with high capacity and high output configured by connecting a large number of the above-described power supply devices in series or in parallel to obtain electric power for driving a vehicle, and by further adding a necessary controller, will be described.

(Power Supply Device for Hybrid Vehicles)

Figure 12:
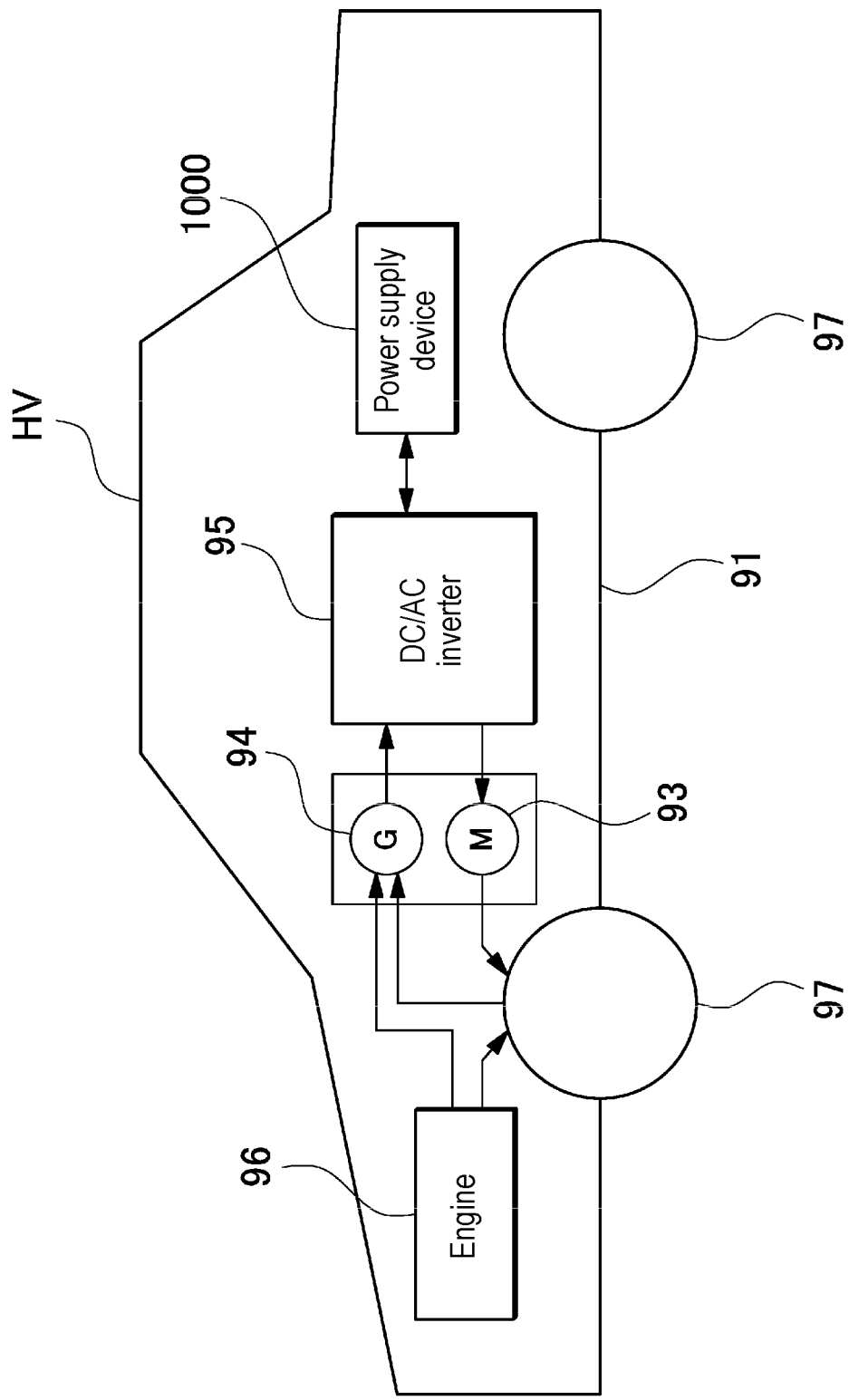
FIG. 12 is a block diagram illustrating an example in which a power supply device is mounted on a hybrid vehicle traveling using an engine and a motor.

FIG. 12 shows an example in which a power supply device is mounted on a hybrid vehicle traveling using both an engine and a motor. Vehicle HV equipped with the power supply device illustrated in the drawing includes vehicle body 91, engine 96 for causing vehicle body 91 to travel, motor 93 for traveling, wheels 97 that are driven using engine 96 and motor 93 for traveling, power supply device 1000 that supplies electric power to motor 93, and generator 94 that charges a battery of power supply device 1000. Power supply device 1000 is connected to motor 93 and generator 94 via DC/AC inverter 95. Vehicle HV travels using both motor 93 and engine 96 while charging and discharging the battery of power supply device 1000. Motor 93 is driven to cause the vehicle to travel in a region having a low engine efficiency, such as during accelerating or traveling at a low speed. Motor 93 is driven by electric power supplied from power supply device 1000. Generator 94 is driven using engine 96, or regenerative braking when the vehicle is braked, to charge the battery of power supply device 1000.

(Power Supply Device for Electric Vehicles)

Figure 13:
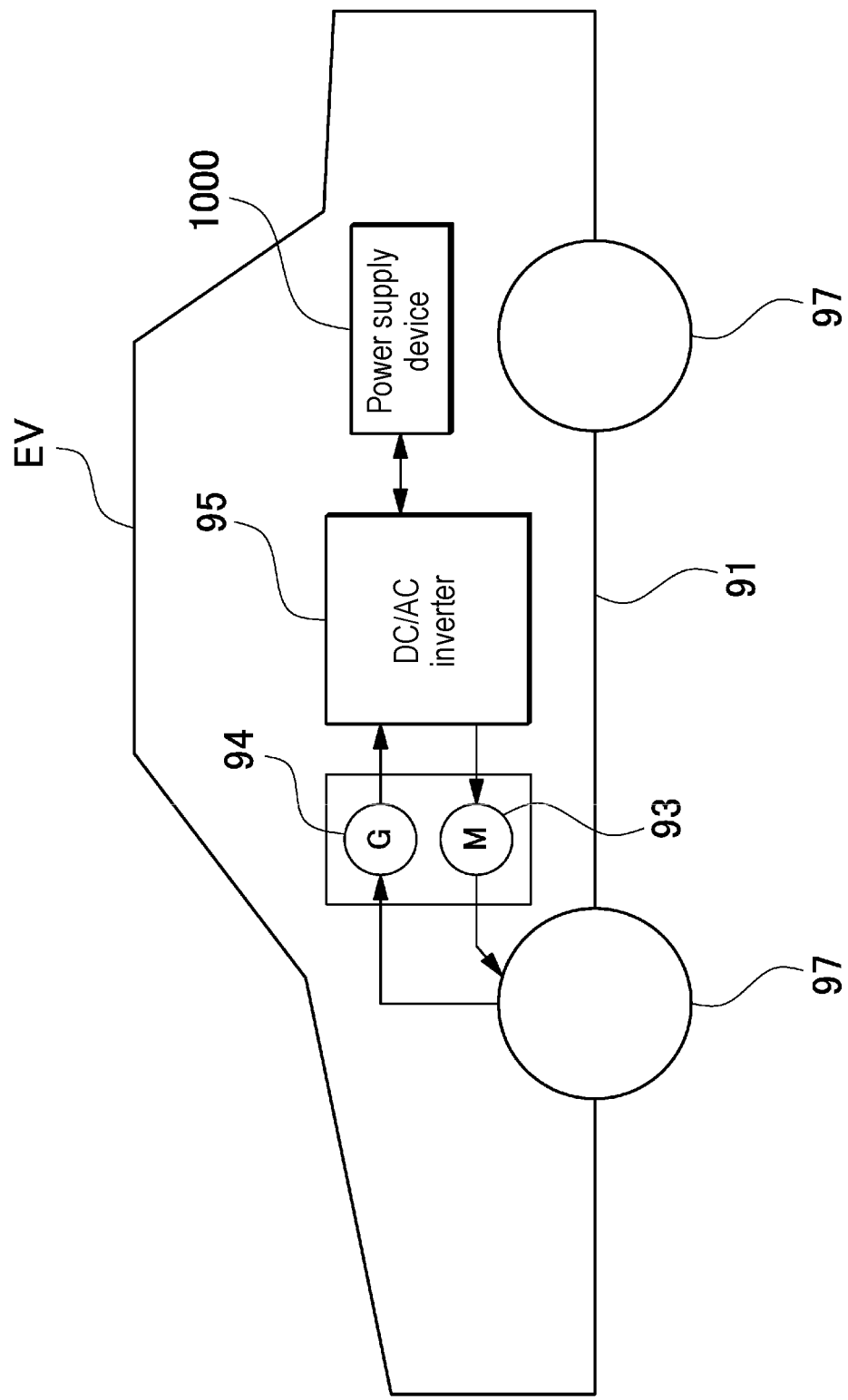
FIG. 13 is a block diagram illustrating an example in which a power supply device is mounted on an electric vehicle traveling using only a motor.

FIG. 13 illustrates an example in which a power supply device is mounted on an electric vehicle traveling using only a motor. Vehicle EV equipped with the power supply device illustrated in the drawing includes vehicle body 91, motor 93 for traveling that causes vehicle body 91 to travel, wheels 97 that are driven using this motor 93, power supply device 1000 that supplies electric power to this motor 93, and generator 94 that charges a battery of this power supply device 1000. Power supply device 100 is connected to motor 93 and generator 94 via DC/AC inverter 95. Motor 93 is driven by electric power supplied from power supply device 1000. Generator 94 is driven by energy when vehicle EV is regeneratively braked, and charges the battery of power supply device 1000.

(Power Storage System)

Figure 14:
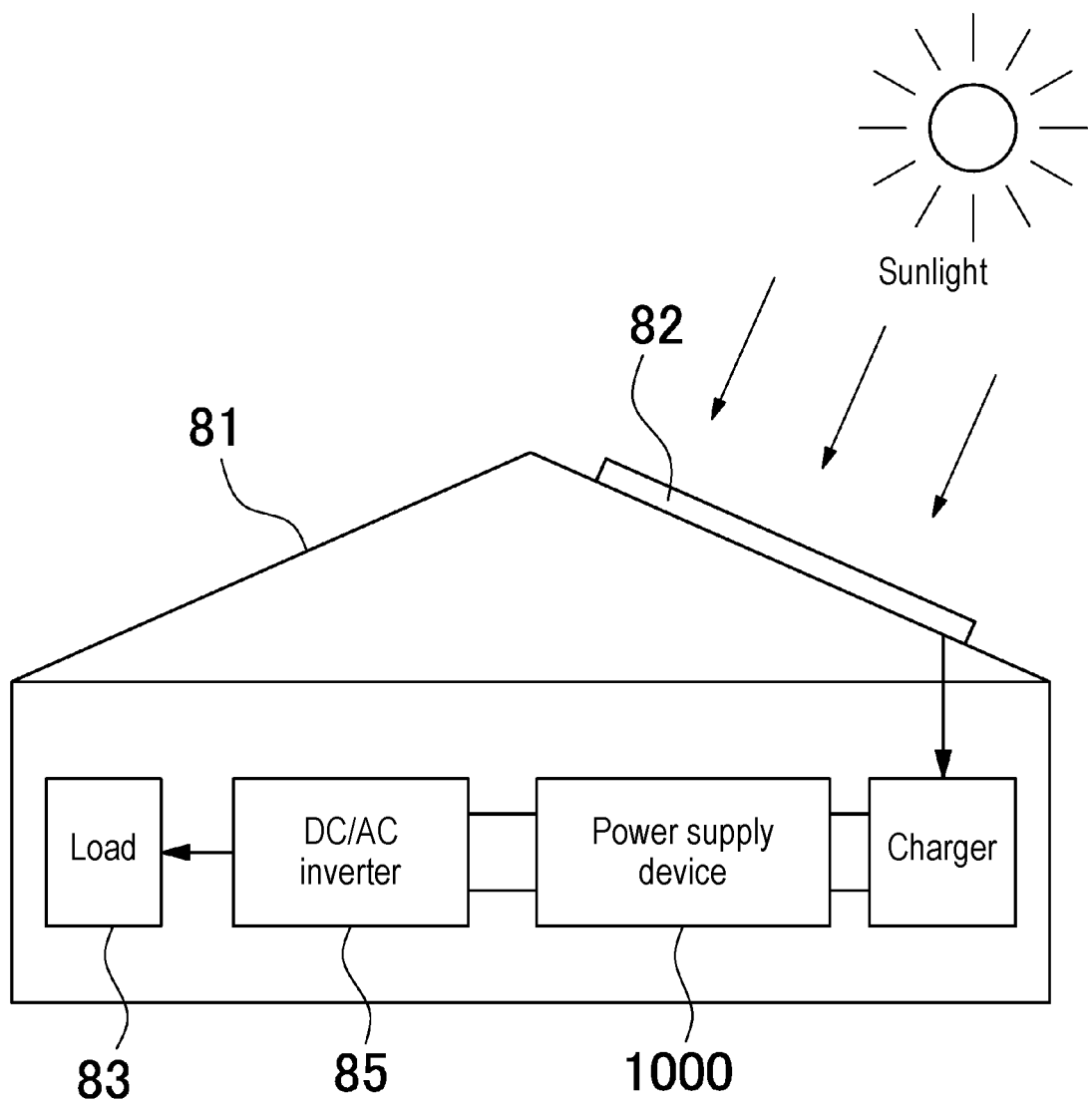
FIG. 14 is a block diagram illustrating an example applied to a power supply device for power storage.

The present invention does not specify a use of the power supply device as a power source of a motor that causes a vehicle to travel. The power supply device according to the exemplary embodiment can also be used as a power source of a power storage system that charges a battery with electric power generated by solar power generation, wind power generation, or the like, and stores electricity. FIG. 14 illustrates a power storage system in which a battery of power supply device 1000 is charged using a solar battery to store electricity. As illustrated in the drawing, the power storage system illustrated in the drawing charges the battery of power supply device 100 with electric power generated by solar battery 82 disposed on a roof or a rooftop of building 81 such as a house or a factory. This power storage system further supplies power stored in power supply device 100 to load 83 via DC/AC inverter 85.

Although not illustrated, the power supply device can also be used as a power source of a power storage system that charges a battery and stores electricity by using midnight power at night. The power supply device charged with the midnight power enables limiting peak power during a daytime to a small value by charging using the midnight power that is surplus power of a power plant, and outputting power during the daytime in which power load increases. The power supply device can also be used as a power source that is charged using both output of a solar battery and the midnight power. This power supply device can efficiently store electricity by effectively using both electric power generated by a solar battery and the midnight power in consideration of weather and power consumption.

The power storage system as described above can be suitably used for applications such as a backup power supply device that can be installed in a rack of a computer server, a backup power supply device for a wireless base station for a cellular phone or the like, a power source for storing electricity for a home or a factory, a power source of a street light, a power storage device combined with a solar battery, and a backup power source for a traffic light and a traffic indicator for a road.

INDUSTRIAL APPLICABILITY

The power supply device according to the present invention and a vehicle equipped with the power supply device can be suitably used as a power source for a large current used for a power source of a motor for driving an electric vehicle such as a hybrid vehicle, a fuel cell vehicle, an electric vehicle, or an electric motorcycle. Examples of the power supply device includes a power supply device for a plug-in hybrid electric vehicle that can be switched between an EV traveling mode and an HEV traveling mode, a power supply device for a hybrid electric vehicle, a power supply device for an electric vehicle, and the like. The power supply device also can be suitably used for applications such as a backup power supply device that can be installed in a rack of a computer server, a backup power supply device for a wireless base station for a cellular phone or the like, a power source for storing electricity for a home or a factory, a power source or the like of a street light, a power storage device combined with a solar battery, and a backup power source for a traffic light or the like.

REFERENCE MARKS IN THE DRAWINGS

1: secondary battery cell
1*a*: exterior can
1*b*: sealing plate
2: battery stack
3: end plate
4: fastening member
5: controller
5*a*: detection circuit
10: terminal surface
11: electrode terminal
12: separator
13: end surface spacer
15: gas discharge valve
16: bus bar
19: fastener
36: first through-hole
40: body portion
41: fixing portion
42: through-hole
44: bent portion
50: cover part
51: upper cover
52: locking hole
55: main-path cover
56: holder part
57: bus bar holding part
58: wall portion
58A: first wall portion
58B: second wall portion
59: locking hook
59*a*: vertical surface
59*b*: inclined surface
59*c*: locking surface
60: gas guide path
61: main path
62: sub-path
62A: first sub-path
62B: second sub-path
63: exhaust port
64: horizontal gas flow bending portion
64*a*: first opening
64*b*: second opening
65: vertical gas flow bending portion
66: end surface wall
70: current fuse
71: thermal fuse
81: building
82: solar battery
83: load
85: DC/AC inverter
91: vehicle body
93: motor
94: generator
95: DC/AC inverter
96: engine
97: wheel
100, 1000: power supply device
PL: power supply line
VL: voltage detection line
HV: vehicle
EV: vehicle

The invention claimed is:

1. A power supply device comprising:
   a plurality of secondary battery cells each including a gas discharge valve for discharging internal gas;
   a plurality of voltage detection lines each being for detecting a voltage of a corresponding one of the plurality of secondary battery cells;
   a plurality of current fuses each provided in a respective one of the plurality of voltage detection lines to shut off a current flowing through the voltage detection line when the current exceeds a predetermined value; and
   a gas guide path communicating with the gas discharge valve to discharge gas discharged from the gas discharge valve to outside,
   at least one of the plurality of current fuses being disposed in the gas guide path, and being a thermal fuse that shuts off the current depending on temperature of the gas discharged from the gas discharge valve.

2. The power supply device according to claim 1, further comprising:
   a detection circuit for detecting an operating state of the thermal fuse;
   a power supply line connected to the plurality of secondary battery cells to supply power to the detection circuit; and
   a current fuse provided in the power supply line to shut off current flow when a current flowing through the power supply line exceeds a predetermined value,
   wherein the current fuse provided in the power supply line is disposed in the gas guide path, and is configured not to shut off current flow depending on temperature of gas discharged from the gas discharge valve and to continue power supply to the detection circuit through the power supply line even when gas is discharged from the gas discharge valve.

3. The power supply device according to claim 1, wherein the plurality of current fuses are disposed in the gas guide path, and any two or more of the plurality of current fuses are the thermal fuses, respectively.

4. The power supply device according to claim 1, further comprising a cover part covering a battery stack in which the plurality of secondary battery cells is connected,
   wherein the cover part is provided inside with the gas guide path partitioned,
   each of the secondary battery cells includes an exterior can in a square shape having an outline with a thickness less than a width,
   the exterior can in a square shape has one surface provided with the gas discharge valve,
   the battery stack includes the plurality of secondary battery cells that are each in a square shape and are stacked while having surfaces that are each provided with the gas discharge valve and that are flush with each other,
   the gas guide path includes a main path in a linear shape, facing each gas discharge valve of the plurality of secondary battery cells, and one or more sub-paths communicating with the main path, which are provided above the plurality of secondary battery cells, and
   the thermal fuse is disposed in each of the one or more sub-paths.

5. The power supply device according to claim 4, wherein one or more sub-paths are disposed parallel to the main path.

6. The power supply device according to claim 1, wherein the thermal fuse is configured to shut off current flow at 300° C. or lower.

7. A vehicle comprising:
   the power supply device according to claim 1;
   a motor for traveling supplied with electric power from the power supply device;
   a vehicle body mounted with the power supply device and the motor; and
   wheels driven by the motor to allow the vehicle body to travel.

* * * * *